US006443494B1

(12) United States Patent
Lieberman Zadjman et al.

(10) Patent No.: US 6,443,494 B1
(45) Date of Patent: Sep. 3, 2002

(54) REMOVABLE OPTICAL SECURITY FILM PLACED ON PRINTED SURFACES AND/OR PRODUCTS CONTAINING SUCH FILM

(76) Inventors: Daniel Lieberman Zadjman, Pino 343, Local 42, Col. Santa Maria La Ribera, C.P. 06400 (MX); Ramon Bautista Perez-Salazar, Pino 343, Local 42, Col. Santa Maria La Ribera, C.P. 06400 (MX)

( * ) Notice: Subject to any disclaimer, the term of this patent is extended or adjusted under 35 U.S.C. 154(b) by 0 days.

(21) Appl. No.: 09/589,950

(22) Filed: Jun. 8, 2000

(51) Int. Cl.[7] ............................ B42D 15/00; B32B 7/06

(52) U.S. Cl. ............................ 283/101; 283/86; 283/91

(58) Field of Search ............................ 283/86, 91, 101, 283/93, 107, 109

(56) References Cited

U.S. PATENT DOCUMENTS

| | | | | | |
|---|---|---|---|---|---|
| 4,121,003 | A | * | 10/1978 | Williams | 428/40 |
| 4,184,701 | A | * | 1/1980 | Franklin et al. | 283/9 R |
| 5,319,475 | A | * | 6/1994 | Kay et al. | 428/915 |
| 5,743,981 | A | * | 4/1998 | Lu | 156/182 |
| 5,913,543 | A | * | 6/1999 | Curiel | 283/103 |
| 6,087,075 | A | * | 7/2000 | Kler et al. | 430/321 |

* cited by examiner

*Primary Examiner*—Cathy Lam
(74) *Attorney, Agent, or Firm*—Brown, Martin, Haller & McClain, LLP

(57) ABSTRACT

An optical security article has a substrate with printed information and an optical security coating adhered to the substrate over the printed information. The security coating contains engraved optical elements which cannot be readily duplicated. The coating has adhesive characteristics whereby it is temporarily adhered to the substrate to resist accidental removal or peeling off, while permitting the coating to be scratched or scraped off to reveal the underlying information.

10 Claims, No Drawings

REMOVABLE OPTICAL SECURITY FILM PLACED ON PRINTED SURFACES AND/OR PRODUCTS CONTAINING SUCH FILM

BACKGROUND OF THE INVENTION

The present invention relates generally to optical security coatings for protection of a print and/or object, and is particularly concerned with a removable optical security coating applied to a substrate in order to totally or completely hide confidential information printed on the substrate and to authenticate the information, and to a method of making such an optical security device.

Currently, there exists in the market a series of printed documents such as calling cards, instant lottery tickets, promotions, licenses, event tickets, and similar items, which contain information, activation codes, prizes, etc. hidden by means of a removable material. The purpose of the removable material is to ensure the confidentiality of the code or message printed under the material before it is acquired by the final consumer. However, a problem faced by this type of application of removable material on products is the possibility that, after the removable material is removed from the surface and the hidden information is used, the document is then discarded by the user. The discarded document, which no longer has any commercial value, can be picked up and reused illegally, by reapplying the removable material, typically a gray scratch-off coating, in order to sell the document as new. Additionally, the document can be re-printed in any conventional printing method to imitate the original, since both the original and the gray coating can be readily imitated.

To date, there is no security measure which would indicate the reprocessing or duplication of such documents which have already been used, and the authenticity of such documents cannot be checked. Thus, users who purchase these reprocessed documents suffer an economic loss, and the manufacturers or issuers suffer damage to their image, in addition to economic losses.

The current technique involves the application of a removable material to a smooth surface by conventional printing methods such as flexography, serigraphy, offset, rotagravure, hot stamping, and the like. However, the removable material does not have any security measures or elements to identify reprocessed or duplicated documents, so any printer may easily reapply the film or copy the print with the film by conventional printing methods.

SUMMARY OF THE INVENTION

It is an object of the present invention to provide a new and improved optical security article and method.

According to one aspect of the present invention, an optical security article is provided, which comprises a substrate carrying printed information and an optical security coating removably applied over the information on the substrate, the optical security coating having engraved optical elements and having an adhesive component for adhesively securing the coating to the substrate, the adhesive component having a predetermined adherence strength for resisting accidental removal of the coating from the substrate by frictional forces, and permitting complete removal of the coating from the substrate by scratching or scraping it off the substrate without damaging or altering the printed information on the substrate.

The optical security coating has optical elements having characteristics which cannot be duplicated by conventional printing methods, and can be applied or transferred to the substrate by any traditional or non-traditional method, such as hot stamping, cold foil transfer, a UV lacquer process, or the like.

The optical security coating has a predetermined balance between adhesion strength and removal strength such that it will not be removed accidentally, but can be readily scratched or scraped off by a user without damage to the underlying printed information.

The removable optical security coating will authenticate and validate the confidential information previously printed on the underlying surface. In addition to the optical security characteristics, the optical security coating also has the correct balance between adhesion strength and frictional removal strength, which gives it additional characteristics as a security element preventing reprocessing of documents already used. The optical coating may include any type of optical elements that give consumers confidence that the article has not been reused or duplicated, and therefore that the hidden information has not been seen or used by anyone else, thus ensuring its confidentiality.

The optical security coating may be opaque or transparent. The purpose of an opaque optical security coating is to hide the underlying information, which may be a prize code, for example. A transparent optical security coating may be used to validate the visible information, since, by removing the coating, an optical effect validating the underlying information may appear.

The optical coating may be only partially removed in some cases. The printed information, together with permanent parts of the coating (after the coating is removed) may give a correct code in order to validate the printed information.

According to another aspect of the present invention, a method of applying a security coating to a substrate is provided, which comprises transfer of a coating containing an optical image onto a substrate in order to at least partially cover printed information on the substate using a transfer printing process, such that the coating is removably adhered to the substrate with sufficient adhesion strength to resist any accidental peeling off of the coating, and is completely removable from the underlying substrate without altering or damaging the substrate by scratching or scraping off the coating from the substrate.

The coating may be transferred onto the substrate by a transfer printing process selected from the group consisting of flexography, serigraphy, offset, rotogravure, labeling, hot stamping, cold foil, or UV lacquer. Optical elements are engraved microscopically into the coating either prior to or after tansfer onto the substrate, and the optical elements are selected from the group consisting of holograms, diffraction gradients, optically variable diffraction elements (OVD), dot matrix elements, computer generated holograms, stereograms, hexelgrams, and kinegrams.

After transfer onto the substrate, the optical security coating can only be removed by scratching or scraping it from the substrate, and is designed to be released without damaging the substrate or leaving any residue on the substrate. However, after removal of the coating to reveal the information underneath, the coating cannot be reproduced in any attempt to duplicate the original article or re-apply a coating to the article after use. This is because the coating contains optical security information which cannot be reproduced.

DETAILED DESCRIPTION OF EXEMPLARY EMBODIMENTS OF THE INVENTION

This invention involves an optical security coating that can be applied by any printing method known in the field, such as flexography, serigraphy, offset, rotogravure, labeling, hot stamping, and the like, but with the additional step of engraving optical elements into the coating , so as to provide security to the document or surface to which the coating is applied. The removable coating has optical characteristics that prevent the illicit reuse or reprocessing of the substrate to which it is initially applied, giving the final user security that the information contained in the document has been kept confidential.

The optical coating may be totally or partially removed, showing that the printed information has already been used, thus offering a security element by which the user can easily and fully identify the article as original.

The term "optical coating" as used herein refers to the microscopic engraving of any optical element on a coating or transfer material. The optical elements that may be engraved microscopically on a coating can be, without limitation thereto, holograms, diffraction elements, optically variable diffraction elements (OVD), dot matrix elements (at any resolution), computer-generated holograms, stereograms, hexelgrams, kinegrams, and the like. This type of optical element generates optical reliefs, and cannot be easily circumvented or duplicated without authorization.

It must be understood that the incorporation of the optical element or elements is not limited to the aforementioned interference patterns; it may be extrapolated to produce optical elements in the volume of the coating by the well-known system used to generate holograms and/or optical reflection elements.

The type of information protected by the removable optical security coating may be, for example, activation codes, prizes, lottery numbers, codes, logos, photographs, numbers, and the like. This confidential information is contained in printed documents such as calling cards, instant lottery tickets, promotions, licenses, collectible cards, event tickets, and similar documents.

Generally speaking, this invention's removable optical coating includes both the temporary application of a removable material with adhesive characteristics on the substrate to which it is applied, and the engraving of optical elements onto the removable material. In this sense, the correct balance will be achieved if the removable material and optical elements of the coating resist the friction forces generated, for example, during packing, distribution, and exhibition of the article, and similar actions, when handling the article to which the optical security coating is applied. At the same time, the optical coating can be easily removed to see the information underneath, by scratching or scraping off the coating. Thus, excessive adherence strength of the removable material would cause the destruction of the base or printed information when trying to remove the coating which contains a security measure to prevent reading of the information. Insufficient adherence strength would make the removable coating peel off when the product is handled, thus making the product unusable, because the hidden information would be exposed.

The removable optical security coating is normally opaque to hide the printed information under the coating. However, it may be transparent. In one embodiment of the invention, the coating is opaque in order to hide all the information found under the security coating. In an alternative embodiment, a transparent optical coating is used to validate the visible information under the coating when, after removing the coating, an optical effect validating the information underneath finally appears. In this case, a transparent optical security coating will validate the information when it is under a transparent removable coating with the same refraction index. By removing the transparent removable coating, the optical security effect engraved underneath on the other fixed, transparent coating will be activated, validating the information printed on the object or document.

EXAMPLES

The following are examples of some methods which may be used to apply the removable optical security coating to an underlying substrate according to the invention. It will be understood that other methods may alternatively be used.

1. Hot Stamping Method

In this method, a first coating layer is applied to the substrate in order to prevent an optical coating layer applied by hot stamping from remaining permanently adhered to the substrate, and to make it adhere temporarily. In one example, a film coating of a type of lacquer comprising a stripping or release agent, for example a lacquer containing silicone, is applied to the substrate. This lacquer will prevent permanent adhesion of the hot stamping. The hot stamping coating will be selected to have adequate properties to adhere temporarily to the underlying first coating.

The removable coating may be applied to the substrate by flexography at a printing station. This printing method by flexography allows a type of lacquer containing silicone or another stripping material to be impregnated by using anilox rollers on the substrate, precisely on the required area. Silicones or stripping materials are chemical products which, due to their physicochemical properties, prevent any substance or material from permanently sticking to them. In the printing station, the first coating of lacquer is applied to the substrate, and then the article goes to a drying station, where the lacquer is dried on the substrate.

Anilox rollers have small cavities in which the lacquer is stored and from which it is transferred to a photo-polymeric stencil plate, which has the drawing of the area on which the application will be made. Thus, the stencil plate with the relief area takes ink from the anilox roller and transfers it to the substrate. After the lacquer is transferred to the substrate, the substrate is immediately moved to a drying station. The lacquer may be solvent-based or water-based, or designed for ultraviolet (UV) curing.

After the drying station, the substrate is moved to a hot stamping station. The substrate is placed so that an optical hot-stamping layer which has been engraved is transferred onto the substrate by application of heat and pressure. The optical hot-stamping coating must be transferred easily to the substrate and remain temporarily adhered to it. For this purpose, the coating must have the proper formulation of adhesives and stripping agents, i.e. the correct balance between adhesion strength and removal strength, such that the material will always work under the same pressure and temperature conditions.

For example, an optical hot-stamping in one embodiment may comprise a polyester "carrier" to which stripping lacquer is first applied to achieve the transfer. A second lacquer, which is optically engraved, is applied over the first lacquer or wax. A metal coating is applied on top of the second lacquer, in order to give "optical effect" reflectiveness. An adhesive is then applied over the metal coating. The adhesive is heat activated. The laminated structure is then transferred to the substrate by hot stamping, with the adhesive temporarily adhered to the substrate, and the polyester carrier is removed, thus forming the optical security coating over the substrate.

After application of the optical coating, and due to the characteristics described above, it can be easily removed by scratching, for example with a coin or the like, in the area where the security coating was placed. This works in exactly the same way as scratching instant lottery tickets.

2. Ultraviolet Method

In this method, the substrate to which the optical security coating will be applied must also first have a coating applied that prevents permanent adhesion of the removable coating. For this purpose, a first coating is applied, such as an X-type ultraviolet (UV) lacquer. This type of lacquer is formulated such that, after being cured, it provides increased resistance to friction. In addition, the chemical composition of the first lacquer coating is selected so as to not allow permanent adhesion of a second, Y-type of lacquer cured over it. The second, Y-type of lacquer is designed so that, after being cured, it is easy to break, so that it can be scratched off without problems. The method steps basically consist of printing, engraving, and curing.

The removable coating may be applied to the substrate by flexography. The flexographic printing method uses anilox rollers and allows the substrate to be impregnated precisely in the area where the application of an X-type lacquer is desired. Anilox rollers have small cavities in which the lacquer is stored and from which it is transferred to a photo-polymeric stencil plate, which has the drawing of the area on which the application will be made. Thus, the stencil plate with the relief area takes ink from the anilox roller and transfers it to the substrate. After the lacquer is transferred to the substrate, the substrate is immediately moved to a curing station using ultraviolet radiation.

After the type-X lacquer is cured over the substrate, the substrate with the first coating layer is transferred to a station where a second UV lacquer coating is applied, this being a type-Y lacquer. At this station, the type-Y lacquer is placed directly over the first, type-X UV lacquer. After application of the second lacquer, the substrate carrying both lacquers is moved to a semi-curing station, and from there it is transferred to an engraving station, where an engraving roller has the optical image which will be engraved over the semi-cured type-Y UV lacquer coating. After the optical image is engraved over the semi-cured lacquer coating which covers the confidential information on the substrate, the article is moved to a final UV curing station in order to permanently affix the optical image on the type-Y lacquer coating.

It is very easy to scratch off the type-Y lacquer coating, due to its adhesive characteristics, which are lower than those of a type-X lacquer coating. The latter, once cured, is highly resistant to removal. The removable coating of the type-Y lacquer, with the optical image engraved, may be any color, including transparent. In an exemplary embodiment, black was used for the removable coating, in order to be able to see the optical image more easily. In an alternative arrangement, the optical security effect may be engraved in the type-X lacquer, which will be transparent in this case. In this method, it is not necessary to metallize the coating material which contains the engraved optical security elements.

3. Cold Transfer Method

In this method, the substrate on which the removable optical coating is applied has a first lacquer coating which is a silicone or UV lacquer, which prevents the removable coating from remaining permanently adhered.

As in the first, hot stamping method, the removable coating may be applied to the substrate by flexography at a printing station. This printing method by flexography allows a type of lacquer containing silicone or another stripping material, or a type of ultraviolet lacquer, to be impregnated by using anilox rollers on the substrate, precisely on the required area. In the printing station, the first coating of lacquer is applied to the substrate, and then the article goes to a drying or curing station (depending on the type of lacquer used), where the lacquer is dried or cured on the substrate, and then it is sent to a station where adhesive is applied.

Anilox rollers have small cavities in which the lacquer or ink is stored and from which it is transferred to a photo-polymeric stencil plate, which has the drawing of the area on which the application will be made. Thus, the stencil plate with the relief area takes ink from the anilox roller and transfers it to the substrate. After the lacquer is transferred to the substrate, the substrate is immediately moved to a drying or curing station. The lacquer may be solvent-based or water-based, or designed for ultraviolet (UV) curing.

After the lacquer or ink coating is applied to the substrate, and dried or cured, the substrate is transferred to a station where a special type of adhesive is applied. The adhesive is adhered to the lacquer coating. The article is then moved to a further station where transfer material containing an optical security image is transferred from a cold roller onto the substrate by application of pressure. The transfer material is adhered non-permanently to the lacquer coating by the adhesive, resisting accidental removal, but permitting the transfer material coating to be scratched or scraped off.

Although exemplary embodiments of the invention have been described above by way of example only, it will be understood by those skilled in the field that modifications may be made to the disclosed embodiment without departing from the scope of the invention, which is defined by the appended claims.

We claim:

1. An optical security article, comprising:

a substrate carrying printed information;

an optical security coating removably applied over the information on the substrate, the optical security coating carrying engraved optical elements; and adhesive means adhesively securing the coating to the substrate, the adhesive means being resistant to accidental removal of the coating from the substrate by frictional forces, and permitting complete removal of the coating from the substrate without damaging or altering the printed information on the substrate, whereby the printed information is visible.

2. The article as claimed in claim 1, including a transparent release coating applied to the substrate between the substrate and optical security coating for preventing permanent adhesion of the optical security coating to the substrate.

3. The article as claimed in claim 1, wherein the optical security coating includes stripping agents for preventing the coating from being permanently adhered to the substrate.

4. The article as claimed in claim 1, wherein the optical security coating is opaque, whereby the coating hides the information printed on the substrate until it is removed.

5. The article as claimed in claim 1, wherein the optical elements are selected from a group consisting of holograms, diffraction gradients, optically variable diffraction elements (OVD), dot matrix elements,computer-generated holograms, stereograms, hexelgrams, and kinegrams.

6. The article as claimed in claim 1, wherein the printed information on the substrate is selected from a group consisting of activation codes, prizes, codes, photographs, logos, and numbers.

7. The article as claimed in claim 1, including a first coating on the substrate for preventing permanent adhesion of the optical coating to the substrate, and a second coating removably applied over the first coating, the second coating being engraved with a predetermined optical image, the first coating comprising a first lacquer material having a first adhesive strength and the second coating comprising a second lacquer material having a second adhesive strength less than the first adhesive strength, whereby the second lacquer material can be scratched off the first coating.

8. The article as claimed in claim 1, wherein the optical security coating has adhesive characteristics providing said adhesive means for temporarily adhering the coating to the substrate.

9. The article as claimed in claim 1, wherein the optical security coating includes an optically engraved lacquer layer and a metal coating.

10. An optical security article, comprising:

a substrate carrying printed information;

an optical security coating removably applied over the information on the substrate, the optical security coating having engraved optical elements; and the optical security coating having an adhesive component for adhesively securing the coating to the substrate, the adhesive component having a predetermined adherence strength for resisting accidental removal of the coating from the substrate by frictional forces, and permitting complete removal of the coating from the substrate by scratching or scraping it off the substrate without damaging or altering the printed information on the substrate.

* * * * *